No. 634,660. Patented Oct. 10, 1899.
W. C. DAVIS.
CAM OR PULLEY FASTENING.
(Application filed Feb. 23, 1898.)
(No Model.)
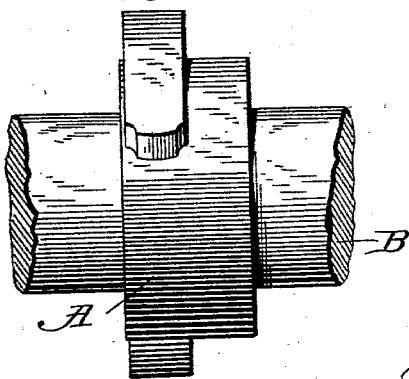
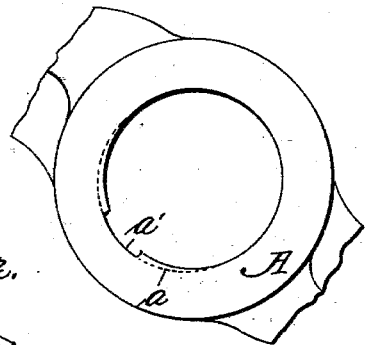
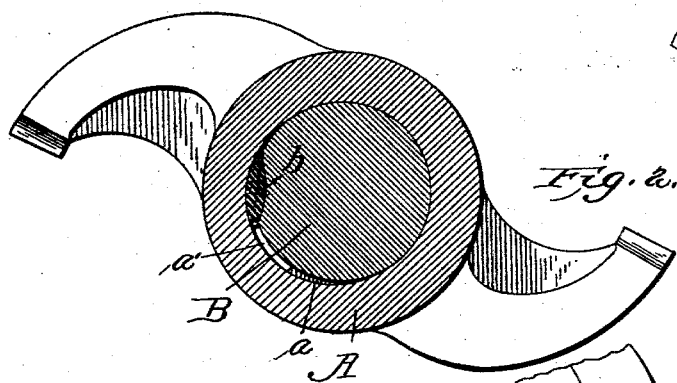
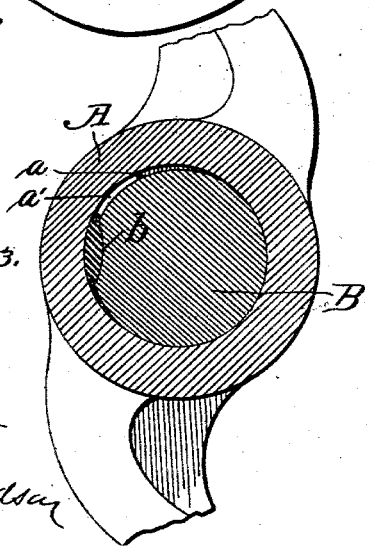
Attest
James M. Lhiar
Walter Donaldson
Inventor
Wm. C. Davis
by Ellis Spear
Atty.

UNITED STATES PATENT OFFICE.

WILLIAM C. DAVIS, OF DENVER, COLORADO.

CAM OR PULLEY FASTENING.

SPECIFICATION forming part of Letters Patent No. 634,660, dated October 10, 1899.

Application filed February 23, 1898. Serial No. 671,301. (No model.)

*To all whom it may concern:*

Be it known that I, WILLIAM C. DAVIS, a citizen of the United States, residing at Denver, county of Arapahoe, State of Colorado, have invented certain new and useful Improvements in Cam or Pulley Fastenings, of which the following is a specification.

My invention relates to improvements in means for securing cams, pulleys, or the like to shafts.

The object of the invention is to provide a construction such that when the key or wedge and the hub of the cam or pulley are in place upon the shaft a slight turn will wedge or bind the hub tightly on the shaft, absolutely preventing further movement and always locking it at exactly the same point.

A further object is to provide a construction in which the wedge-block or key will always have a full bearing both in the hub and shaft.

The invention is illustrated in the accompanying drawings, in which—

Figure 1 is a side elevation of a cam in place upon a shaft. Fig. 2 is a sectional view taken through the hub, shaft, and block or key. Fig. 3 is a similar view showing the cam keyed against movement in the opposite direction. Fig. 4 is an end view of the hub with the shaft removed.

Referring to the drawings, A represents the hub of a cam or other similar device, and B the shaft to which it is to be secured. The hub is bored out to accurately fit upon the shaft, as shown in Fig. 1, and in addition is provided on its inner periphery, midway between the sides or edges, with an eccentric groove or channel *a*, deepest in the center and gradually decreasing in depth toward each end. The shaft is provided with a key-seat *b* in the face thereof, having a curved bottom, and within this is seated the wedge-block or key, which has a face curved to correspond exactly with the curve of the key-seat. The other face of the key is curved to correspond exactly with the curved face of the eccentric groove, and in practice it is desirable to form the face of the eccentric groove or channel on the same curve as the key-seat and the two faces of the key identical. The hub is cut away, as shown at *a'* in Fig. 4, to permit it to be slipped on the shaft and over the key until the key or wedge-block is in line with the eccentric groove or channel, when a slight turn of the hub in either direction securely locks it against further movement in that direction, the key sliding in its key-seat until the outer face positions itself so as to be exactly concentric with the adjacent portion of the eccentric channel, thus affording a bearing of the full width of the key both between the key and its seat and the outer face of the key and the eccentric channel, as clearly shown in Figs. 2 and 3.

Having thus described my invention, what I claim is—

1. In combination, the shaft and the hub mounted thereon, one of said parts having a curved key seat or recess, and a wedge-block or key seated in said key-seat and having a curved outer face, the other of said parts having an eccentric surface corresponding to the curve of the said outer face of the key, substantially as described.

2. In combination, the shaft having a curved recess therein, the hub having an eccentric groove or channel, and the wedge-block having one face curved to correspond to the recess and the other face curved to correspond to the curve of the eccentric groove, substantially as described.

3. In combination, the shaft having a curved key seat or recess, the hub having an eccentric groove or channel formed on a curve corresponding to the curve of the key-seat, and the wedge-block or key having curved faces corresponding to the said curve of the key seat and groove, substantially as described.

4. In combination, the shaft having a curved recess in the face thereof, a hub having an eccentric groove or channel in the inner face intermediate the ends thereof, and the wedge-block loosely seated in said recess, said hub having a cut-away portion to permit the entrance of the key, substantially as described.

In testimony whereof I affix my signature in presence of two witnesses.

WILLIAM C. DAVIS.

Witnesses:
 JOHN R. MARIUS,
 EDITH McATEE.